Dec. 15, 1970  G. TANGORRA  3,547,726
PROCESS FOR MAKING REINFORCED RUBBER ARTICLES
Filed Jan. 4, 1967

INVENTOR
Giorgio Tangorra

BY Stevens, Davis, Miller & Mosher
ATTORNEYS

United States Patent Office 3,547,726
Patented Dec. 15, 1970

3,547,726
**PROCESS FOR MAKING REINFORCED
RUBBER ARTICLES**
Giorgio Tangorra, Milan, Italy, assignor to Pirelli,
Societa per Azioni, Milan, Italy
Filed Jan. 4, 1967, Ser. No. 607,229
Claims priority, application Italy, Jan. 11, 1966,
13,263
Int. Cl. B32b 5/08, 7/10, 31/00
U.S. Cl. 156—276
4 Claims

ABSTRACT OF THE DISCLOSURE

A reinforcing element for articles of vulcanized rubber including at least one supporting layer of uncured vulcanizable rubber having a layer of fibers permanently laid down and oriented thereon, the fibers of adjacent supporting layers being superposed to each other.

A process for the manufacture of a reinforcing element for articles of vulcanized rubber, comprising the steps of forming a supporting layer of uncured vulcanizable rubber, uniformly projecting a plurality of fibers against said layers so that one end of each fiber permanently contacts said supporting layer, and then laying down said fibers in an oriented manner with respect to said layer.

BACKGROUND OF THE INVENTION

Field of the invention

The present invention relates to reinforcing elements for articles of vulcanized rubber, and, more particularly, to reinforcing elements comprising rubber and textile or metallic fibers.

Description of the prior art

Methods for preparing uncured vulcanizable rubber compounds to be molded are generally known. These compounds, in addition to containing the usual ingredients including vulcanizing agents, also contain textile or metallic fibers in order to improve the mechanical resistance, and in particular, the resistance to tension, tear and impact, of articles obtained by means of a suitable process employing said compounds. In these known methods, the fibers are mixed with the uncured rubber in such a way as to be embedded in the compound in a uniform manner.

Also known are methods for preparing sheets from uncured rubber compounds containing fibers disposed at random, and for incorporating these sheets in the rubber article to be cured in order to reinforce the finished vulcanized article.

Also, methods are known for preparing, by means of extrusion, calendering, injection molding or the like, articles or reinforcing sheets by starting from uncured rubber compounds containing fibers disposed at random in order to provide, inter alia, an orientation of the fibers due to the inner flowing produced in the material by the above-indicated processes. After vulcanization, the articles embedding the reinforcing sheets show an anisotropic mechanical behavior which is particularly advantageous in view of particular applications of the finished article.

These processing methods, however, are not devoid of disadvantages.

For example, in the rubber compounds containing fibers, the latter obviously have a limited orientation, and this results in a mechanical anisotropy in the finished article of vulcanized rubber, which is insufficient in view of particular applications, and which is smaller than the mechanical anisotropy of articles provided with a reinforcing structure consisting of textile insertions.

Another disadvantage is the limitation of the weight percentage of the fibers to be embedded in the article, since addition of large amounts of fibers to the rubber affects the further processability of the later, and reduces its plasticity.

Moreover, a common drawback of all the above-indicated methods is that the fibers must be introduced in the rubber during the mixing operation so that they are initially disposed at random and are not oriented. It is therefore necessary to give them a correct orientation in a subsequent phase, with the aid of additional operations which sometimes give unsatisfactory results.

SUMMARY OF THE INVENTION

The present invention is intended to eliminate the above-indicated disadvantages.

A main object of the present invention is to provide a reinforcing element comprising vulcanizable rubber and fibers having a very high degree of orientation.

A further object of the invention is to provide a reinforcing element comprising vulcanizable rubber and fibers embedded in the compound in large amounts.

A further object of the invention is to provide a reinforcing element comprising vulcanizable rubber and fibers, without the need of mixing the latter to the former.

A further object of the invention is to impart a preestablished mechanical anisotropy to a reinforcing element embedding fibers disposed at random or having a different orientation.

A still further object is to provide a process for manufacturing the above-mentioned reinforcing element.

In general, the present invention consists of a reinforcing element for reinforcing articles of vulcanized rubber and including a supporting layer of uncured vulcanizable rubber and a layer of fibers permanently laid down and oriented on at least a part of said supporting layer. The layer of fibers may be applied to the whole area of the support, or to one or more faces of it, or a portion of one of said faces.

The laid down fibers may be all oriented in a single direction or they may be oriented in the same supporting layer in different directions varying in the various zones of its face.

The process, in general, includes the operations of forming a supporting layer made of uncured vulcanizable rubber, projecting the fibers against said supporting layer in a uniform way in a manner so that only one end of each fiber comes in permanent contact with said supporting layer, and laying down said fibers in an oriented way with respect to said layer.

BRIEF DESCRIPTION OF THE DRAWINGS

The present invention will be more clearly understood from the following description, made with reference to the attached drawings, given by way of nonlimiting example, in which.

DESCRIPTION OF THE PREFERRED EMBODIMENTS

Figure 1:
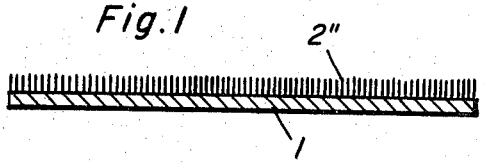
FIG. 1 is a side view of the reinforcing element in an intermediate phase of its preparation.
Figure 2:
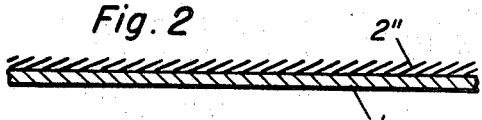
FIG. 2 is a side view of the reinforcing element, after a subsequent phase of its preparation.
Figure 4:
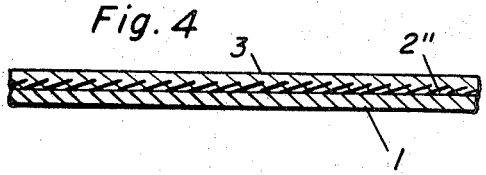
FIG. 4 is a lateral view of the element of FIG. 2, showing its complete structure.
Figure 3:
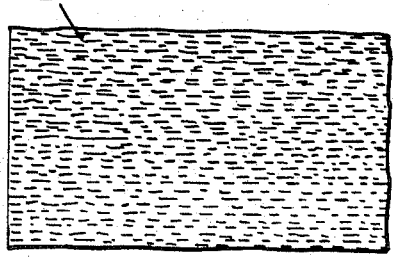
FIG. 3 is a top view of the element shown in FIG. 2.

As seen in FIGS. 1 to 3, the reinforcing element consists of a supporting layer 1, made of uncured vulcanizable rubber which may contain vulcanizing agents, and by a layer of fibers 2' which is shown applied only on one face of the supporting layer.

Although the supporting layer is represented in the figures in the form of a rubber sheet, it is to be understood that it is within the scope of the present invention to provide such a layer in any form, as, for example, in the form of a rubber article ready to be vulcanized.

From FIG. 1 it can be seen that the fibers are disposed in a position normal to the supporting layer in the intermediate phase. As it will be explained herebelow, they are fastened to the supporting layer in this phase.

FIG. 2 illustrates the reinforcing element with the fibers 2" no longer extending normal to the supporting layer, but laying down on its upper face for their whole length in an oriented position. The orientation can be made in a single direction for all the fibers, as shown in FIG. 3, or it can be different in the various zones, according to the particular requirements of mechanical anisotropy to be conferred to the article provided with this reinforcing element.

If desired, the layer of fibers laid down and oriented on the supporting layer may be slightly incorporated in said supporting layer, so that at least one part of the fiber appears on its surface.

For the purposes of the present invention, any natural, artificial or synthetic textile fibers, as well as metallic fibers, can be used.

Fibers having a length of up to 50 mm. may be employed for the purposes of the present invention. It has been ascertained that the best results in the use of the reinforcing element are obtained with fibers having a length ranging between 2 and 30 mm.

The supporting layer may contain fibers disposed at random or oriented, said fibers being incorporated and uniformly distributed in the layer in an already known way.

The application of the layer of laid down and oriented fibers on the upper face of the supporting layer permits, if necessary, an increase or correction of the mechanical anisotropy of the reinforcing element, respectively, the superposition being such that the layers of fibers are all disposed in the same direction or in different directions.

The length of the fibers of the same supporting layer may have a single value which is within the above-indicated range, or different values, also included in said range. Particularly satisfactory results are obtained by adopting two different lengths, the fibers of greater length being applied before those of smaller length and constituting the main portion of the layer of fibers. In the subsequent applications of the fibers, the smaller lengths may have, if desired, a value lower than the indicated minimum value of 2 mm.

The reinforcing element forming the object of the present invention has been hereabove described with reference to a structure constituted by a supporting layer, and by a layer of fibers laid down and oriented with respect to the layer.

Said reinforcing element, having such a structure, is generally combined with other layers before being incorporated in the moldable article to be reinforced. For example, the reinforcing element provided with a specific supporting layer in the form of an uncured vulcanizable rubber sheet, may be completed with the addition of a layer 3 of uncured vulcanizable rubber, superposed to the fibers 2" laid down and oriented on the supporting layer.

If desired, the additional layer 3 of uncured vulcanizable rubber may be covered on both faces with corresponding units of reinforcing elements in such a way that the layers of fibers of said units come in contact with said additional layer, which is therefore disposed in an intermediate position.

The additional layer of uncured vulcanizable rubber, superposed to at least one reinforcing element according to the present invention, may, in turn, contain randomly disposed or oriented fibers, completely incorporated and uniformly distributed. In this manner it is possible to obtain a pre-established increase, or a regulation, of the mechanical anisotropy of the completed reinforcing element if the two groups of fibers have an equal or a different orientation, respectively.

One or more superposed units of the same reinforcing element may be used to complete a reinforcing element, so that the supporting layer of a unit may be in contact with the layer of fibers of the adjacent unit.

To complete a unit of a reinforcing element by means of an analogous unit, their superposition may be made in such a way that the respective layers of fibers are in reciprocal direct contact.

Also, for the superposition of two or more units of the reinforcing element of the present invention between which are interposed one or more layers of uncured vulcanizable rubber, it is necessary to take into account the orientation of the laid down fibers in order that the unit resulting from the superposition may have a pre-established increase of mechanical anisotropy. To this end the layers of laid down fibers of the superposed portion are respectively oriented in coincident or in different directions.

The fibers can be subjected to a suitable treatment, already known per se, intended to improve their bonding to the rubber. In general, this treatment is carried out before the projection of the fibers, but it is also possible to effect it when the fibers are already fastened to the supporting layer.

If the fibers are not treated as described above, their fastening to the rubber can be made by means of ingredients incorporated in the rubber in an already known way.

Figure 5:
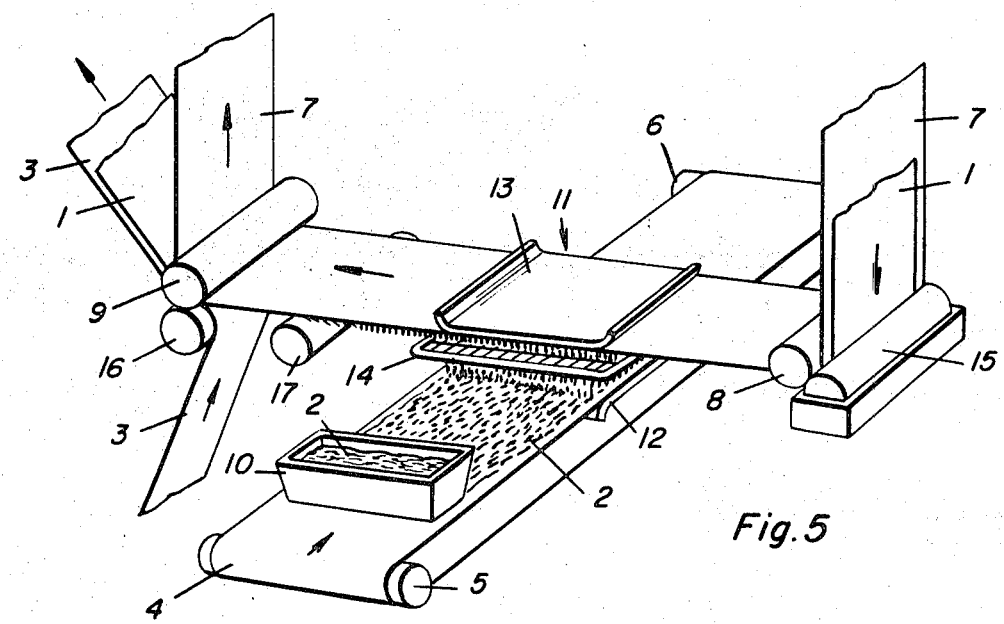
FIG. 5 is a diagrammatic perspective view of an apparatus for preparing the reinforcing element.

The reinforcing element forming the object of the present invention can be manufactured according to a process which will be described herebelow and by means of a suitable apparatus, for instance, the one shown in longitudinal section in FIGS. 5 and 6.

As said above, the process comprises the steps of forming a supporting layer of uncured vulcanizable rubber, or projecting the fibers against this layer in a uniform way so that only one of the fiber ends may come in permanent contact with said supporting layer, and then laying down said fibers in an oriented way.

In order to fasten one end of the fibers to the supporting layer, the surface of the latter to be covered is initially treated in various ways. For example, a layer of adhesive material, preferably based on the same material constituting the supporting layer, may be applied on the surface to be treated, or, alternatively, the surface may be treated by means of a suitable solvent. In view of the above-indicated purposes, it is also possible to subject the supporting layer to a thermal treatment directed to soften its surface.

The apparatus represented in FIGS. 5 and 6, which includes an electrostatic device for the projection of the fibers against the supporting layer, will now be described in detail.

The apparatus essentially consists of two endless conveyor belts 4 and 7, the first of which is assembled on the rollers 5 and 6, and the second of which is assembled on the rollers 8 and 9.

The working sections of said conveyor belts are crossed and superposed at a certain distance. Over the lower belt 4 there is provided a hopper 10, which contains the fibers 2 and which drops them on the moving belt.

Figure 6:
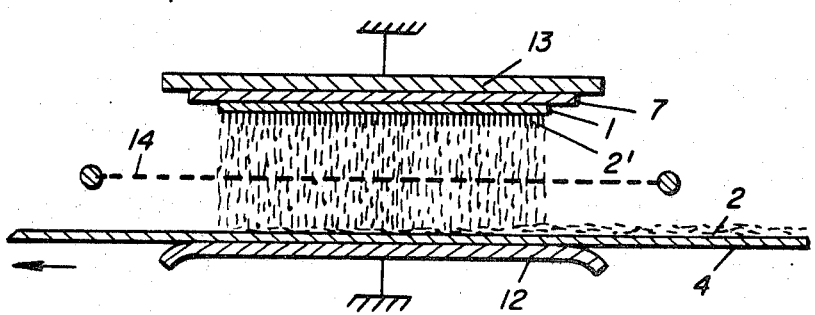
FIG. 6 is a diagrammatic sectional view of the apparatus shown in FIG. 5.

As seen in FIG. 6, which is a longitudinal sectional view taken along belt 4, at the crossing of the working sections of the two conveyor belts 4 and 7, an electrostatic device 11 is provided which consist of two grounded metal plates 12 and 13, and by an accelerating grid 14, to which is applied high voltage electric circuit.

The plate 12 is situated below the lower belt 4, and the plate 13 is situated over the upper belt 7; the grid 14 is disposed between said belts, and therefore is alone in an intermediate position also with respect to the plates 12 and 13. The supporting layer 1 of uncured vulcanizable rubber, having the form of a sheet, moves forward together with the conveyor belt 7, the supporting layer 1 being kept adherent to the lower surface of the belt 7 by means of already known devices. Upstream of the electrostatic device, a means 15 is provided for the application of adhesive material on the moving supporting layer 1. Downstream of the electrostatic device 11 a mechanical means 17 is provided for laying down, in an oriented manner, the fibers 2 projected on the supporting layer 1. By means of the roller 16, coupled to the roller 9, a layer 3 of uncured vulcanizable rubber may be superposed to the reinforcing element so obtained.

The operation of the apparatus is as follows. The fibers 2 dropped from the hopper are gradually carried to the electrostatic device which projects them in an upwardly direction, against the supporting layer 1, the surface of which has been previously treated with adhesive material by means 15. The fibers are projected in a direction perpendicular to the surface of the supporting layer and move in such a way that their axis is maintained along this direction. Once they have reached the adhesive coating of the supporting layer, the fibers remain fastened to it at one of their ends, and maintain a direction perpendicular to said surface.

The supporting layer 1 carrying the fibers 2 in perpendicular position then moves towards the mechanical means 17, which lays down and orients the fibers. Then the reinforcing element thus obtained may be completed with the addition of a layer 3 of uncured vulcanizable rubber, in which case the reinforcing element would be previously treated with an adhesive material by means of a device not represented in the drawings.

The mechanical means 17 for laying down and orienting the fibers can be constituted by shoes, rollers, brushes and the like.

It is understood that the above-described apparatus permits a continuous process to be carried out if the supporting layer 1 is fed to it in a continuous manner.

The supporting layer can consist of a rubber article not yet molded, or in any case, not yet vulcanized, such as for instance a belt, a hose and the like.

The projection of the fibers against the supporting layer may also be carried out with mechanical means, instead of electrostatic means. Also, an electrostatic means may be used for laying down the fibers.

According to a further embodiment of the invention, the supporting layer carrying the fibers in a direction perpendicular to the surface of the support is caused to pass between rotating cylinders in order to obtain the oriented laying down of the fibers.

According to a further embodiment of the invention, the superposition of an additional layer on the reinforcing element is carried out by means of another unit of the reinforcing element. Said superposition may be effected by placing the layer of laid down and oriented fibers of a unit of the reinforcing element in contact with the supporting layer of an adjacent unit of a reinforcing element. The superposition may also be made by using two portions of reinforcing elements with the corresponding layers of fibers placed in direct contact. The superposed layers of rubber are easily joined to one another during the vulcanization of the article incorporating them.

Before superposing the various layers or units of the reinforcing element, it is advisable to apply appropriate adhesive agents on the surfaces which are to come into contact.

In order to increase the adhesion of the layers, it is possible to carry out a mechanical action on the whole assembly. In this case the layers are passed between rotating cylinders or subjected to a static mechanical compression, for instance by hammering, pressing, punching, etc.

It is to be understood that in the present application, the word "rubber" is associated either with the expression "uncured vulcanizable" or with the word "vulcanized" in order to indicate the nature of the material constituting the supporting layer or other parts of the reinforcing element or the finished article.

The word "rubber" certainly means both the natural rubber and the synthetic rubbers, considered as compounds containing the usual vulcanizing and filling ingredients, and moreover, for simplicity of description, it comprises other synthetic, elastomeric or plastomeric high polymers, considered alone or as containing suitable ingredients; as well as a combination of said materials, also in stratified form, provided that such rubbers and high polymers are suitable for the purposes of the present invention. It is also to be understood that, in the elastomeric and plastomeric high polymers which cannot be vulcanized or cross-linked, the setting of the material is obtained according to different modalities.

The reinforcing element forming the object of the present invention can be used for the manufacture of any rubber article provided with a reinforcing structure, which is shaped and vulcanized in a mold, or in any other way, such as pneumatic tires for vehicle wheels, hoses, belts and the like. This use is intended to the formation of a reinforcing structure comprising an integral part of the article. The structure may have, at least in part, a pre-established mechanical anisotropy or a mechanical orthotropy. The mechanical orthotropy is obtained by the superposition of an even number of units of reinforcing element, one half of which has fibers laid down and oriented in one direction and the other half of which has analogous fibers laid down and oriented in a direction normal to that of the first half.

Of course, variations of the specific construction and arrangement of this type article and method herein disclosed can be made by those skilled in the art without departing from the invention as defined in the appended claims.

I claim:

1. A process for the manufacture of a reinforcing element having mechanical anisotropy for articles of vulcanized rubber, comprising the steps of forming a supporting layer of uncured vulcanizable rubber, treating one surface of said supporting layer to share a sticky surface, uniformly projecting a plurality of fibers against said sticky surface so that one end of each fiber firmly contacts it, laying down all said fibers in an oriented manner in a single direction with respect to said layer, applying an adhesive agent on said oriented fibers and then superposing a covering uncured vulcanized rubber thereto.

2. A process as in claim 1, wherein the supporting layer is an article of uncured vulcanizable rubber, ready to be vulcanized.

3. A process as in claim 1, further comprising the step of superposing a layer of additional fibers on said additional layer of uncured vulcanizable rubber before the latter is superposed on the fibers of the first layer of uncured vulcanizable rubber.

4. A process as in claim 1, further comprising the step of subjecting said superposed layers to a compressing mechanical action.

References Cited

UNITED STATES PATENTS

| | | | |
|---|---|---|---|
| 1,121,182 | 12/1914 | Haverstick | 161—53X |
| 1,759,976 | 5/1930 | Cummings | 161—53 |
| 1,878,679 | 9/1932 | Bruijn | 161—53 |
| 2,622,040 | 12/1952 | Harrison | 117—33X |
| 2,801,947 | 8/1957 | Winchester et al. | 264—90 |
| 2,991,208 | 7/1961 | Stieger | 161—53 |
| 3,010,179 | 11/1961 | Thal | 161—63X |
| 3,082,138 | 3/1963 | Hjelt | 156—373X |
| 3,194,702 | 7/1965 | Geller et al. | 117—16X |
| 3,244,572 | 4/1966 | Nicol | 156—276 |
| 3,275,487 | 9/1966 | Lemelson | 161—67X |

FOREIGN PATENTS

| | | | |
|---|---|---|---|
| 621,867 | 4/1949 | Great Britain | 156—276 |

ROBERT F. BURNETT, Primary Examiner

W. A. POWELL, Assistant Examiner

U.S. Cl. X.R.

117—17, 33, 93.4, 139; 161—53, 59, 60, 150, 170